3,132,175
PROCESS FOR THE MANUFACTURE OF
1,4-DICYANOBUTENES
Klaus Born, Hermulheim, near Cologne, Kurt Sennewald, Knapsack, near Cologne, and Alexander Ohorodnik, Neu-Berrenrath, Germany, assignors to Knapsack-Griesheim Aktiengesellschaft, Knapsack, near Cologne, Germany, a corporation of Germany
No Drawing. Filed July 14, 1959, Ser. No. 826,903
Claims priority, application Germany July 19, 1958
9 Claims. (Cl. 260—465.8)

The present invention is concerned with a process for the manufacture of 1,4-dicyanobutenes and, more particularly, with a process for the manufacture of 1,4-dicyanobut-2-ene and 1,4-dicyanobut-1-ene by reacting 1-cyanobuta-1,3-diene with hydrocyanic acid in the presence or absence of inert polar solvents and in the presence of basic catalysts.

It is known to convert 1,4-dihalogen compounds of but-2-ene into 1,4-dicyanobut-2-ene by various methods, for example, by the action of alkali metal cyanides or hydrocyanic acid and alkaline earth metal carbonates in the presence of copper salts. According to another proposal, but-2-ene-1,4-diol is used as starting material which is converted into 1,4-dicyanobut-2-ene by treating it with cuprous cyanide and hydrochloric acid.

The 1,4-dicyano compounds of butenes, like the 1,4-dicyano compound of butane, have gained great importance in industry as intermediate products for the production of hexamethylene diamine.

We have found that hydrocyanic acid adds, under certain conditions, to 1-cyanobuta-1,3-diene, the addition of the hydrocyanic acid taking place only in the 1,4- or 3,4- position and the CN group of the hydrocyanic acid adding in each case to the terminal $CH_2$-group of the 1-cyanobuta-1,3-diene:

$$CH_2=CH-CH=CH-CN + HCN \longrightarrow$$

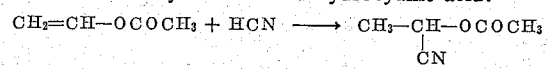

In the case of an addition in the 1,4-position, the double bond is shifted to the middle butene derivative, as can be seen from the above equation.

It is surprising that hydrocyanic acid can be added to the very readily polymerizing 1-cyanobutadiene and the reaction can be conducted in such a manner that no remarkable resinification or polymerization takes place. It is also surprising that the reaction proceeds under the conditions of the present invention in such a manner that of the various addition compounds of hydrocyanic acid and cyanobutadiene to be expected, for example 1,2-dicyanobut-3-ene, 1,2,3-tricyanobutane and 1,2,4-tricyanobutane, only 1,4-dicyanobut-2-ene and 1,4-dicyanobut-1-ene are formed and obtained in a high yield, calculated on the quantities of cyanobutadiene and hydrocyanic acid consumed, and that no further addition of hydrocyanic acid occurs.

The following remarks are made in order to explain the problem of the present invention.

It is known that hydrocyanic acid can be added to various $\alpha,\beta$-mono-olefins which are substituted in the $\alpha$-position, such as acrylonitrile, while obtaining good yields:

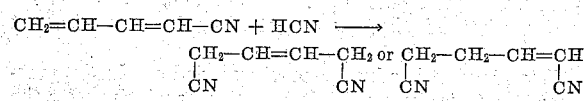

The acrylonitrile is mixed in the presence or absence of solvents with substances giving an alkaline reaction, for example sodium cyanide, sodium hydroxide or potassium carbonate, which substances are added in an amount of 0.2 to 15% by weight, in general about 1% by weight, the percentage being calculated on the total amount of the reaction mixture. The resultant mixture is treated at an elevated temperature with hydrocyanic acid until substantially the whole amount of acrylonitrile has been converted. With this procedure an average of 96% of acrylonitrile undergoes conversion. The yield of succinic acid dinitrile amounts to 97% calculated on the acrylonitrile which has reacted and to 99% calculated on the hydrogen cyanide which has reacted.

In the same manner, $\alpha$-acetoxypropionitrile can be obtained from vinyl acetate and hydrocyanic acid:

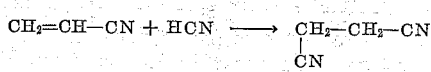

The addition of hydrocyanic acid to unsaturated compounds in the presence of 0.2–15% by weight of substances giving an alkaline reaction is, however, not a reaction of general applicability: it is not even generally applicable to substituted $\alpha,\beta$-mono-olefins. Whereas, for example, $\alpha,\beta$-unsaturated ketones are, in general, well able to add hydrocyanic acid, numerous $\alpha,\beta$-unsaturated acids do not enter into this reaction.

Compounds containing, at most, two olefinic bonds have already been tested for their capability of adding hydrocyanic acid. Buta-1,3-diene does not add hydrocyanic acid under the above-mentioned conditions which have proved successful in the case of substituted mono-olefins. A conversion can only be achieved in the presence of 20 to 30% by weight of cobalt tetracarbonyl, the percentage being calculated on the amount of butadiene used as starting material. A mixture of saturated and unsaturated nitriles, vinyl cyclohexene and butadiene polymers forms from which can be isolated 1-cyanobut-2-ene, 1-cyanobut-3-ene, 2-cyanobut-3-ene, $\alpha,\alpha$-dimethylsuccinic acid-dinitrile and 2,4-dicyanobutane.

Numerous attempts have been described in literature for preparing 1,4-dicyanobutenes by addition of hydrocyanic acid to 1-cyanobutadiene. It has already been said that, in spite of the great number of experiments, which could not be reproduced in each case, only poor results could be obtained. The experiments were carried out in such a manner that approximately molar quantities of cyanobutadiene and hydrocyanic acid were reacted in the presence of potassium cyanide at elevated temperatures, i.e. by heating for 6 hours in a bomb tube at a temperature of 95 to 100° C. for 16 hours at 50 to 70° C. in the presence or absence of solvents, the quantities of potassium cyanide used corresponding to the above-mentioned quantities of basic catalyst used for the addition of hydrocyanic acid to acrylonitrile. Under these conditions, a strong resinification of the reaction mixture occurred in each case while the desired products were formed only in a very small quantity. Moreover, the test results differed widely and could not be reproduced. It has, for example, been described that the reaction of 14.2 cc. (0.152 mol) 1-cyanobutadiene with 5.9 cc. (0.152 mol) hydrocyanic acid in the presence of 0.1 gram potassium cyanide yields a considerable quantity of resinous residues and only a few drops of a reaction product which boils at 120 to 160° C. under a pressure of 14 mm. of mercury and from which 1,4-dicyanobut-2-ene crystallizes out on cooling. No process has hitherto been described in the literature for the manufacture of 1,4-dicyanobutenes from hydrocyanic acid and 1-cyanobutadiene which leads to a good yield of dinitriles, calculated on the starting materials used.

This unsatisfactory course which the reaction for the addition of hydrocyanic acid to 1-cyanobutadient takes under conditions which lead to very good results with substituted mono-olefins, such as acrylonitrile, is due in part to the following facts:

(1) 1-cyanobuta-1,3-diene has a pronounced tendency to polymerize owing to the conjugate double bond system;

(2) The dimerization of 1-cyanobutadiene begins at about −45° C. and increases with the temperature. When 1-cyanobutadiene is reacted with hydrocyanic acid under the conditions hitherto applied, the polymerization and dimerization become the principal reaction. In addition thereto, simultaneous polymerization of the hydrocyanic acid occurs;

(3) The dicyanobutenes which are primarily formed possess a reactive carbon double bond and can therefore react further in various ways.

All these reactions do not occur or occur only to an insignificant extent in the known addition of hydrocyanic acid to mono-olefins.

We have found that the quantity in which the basic catalyst is added is of fundamental importance for the course of the reaction of 1-cyanobutadiene and hydrocyanic acid. 1-cyano-butadiene, and also the dicyanobutenes which are primarily formed, are much more sensitive to alkalies than, for example, acrylonitrile or other mono-olefins. This accounts for the fact that the known processes for the addition of hydrocyanic acid to acrylonitrile cannot be applied to 1-cyanobutadiene. All the quantities of catalyst which have hitherto been proposed are too large for the reaction of cyanobutadiene. They catalyze the polymerization of cyanobutadiene and the polymerization of hydrocyanic acid much more than the formation of dicyanobutene and give rise to secondary reactions of the dicyanobutenes. One of the secondary reactions which consumes the 1,4-dicyanobut-1-ene which has primarily formed, consists, for example, in a further reaction with hydrocyanic acid with the formation of 1,2,4-tricyanobutane, while the 1,4-dicyanobut-2-ene which has primarily formed is simultaneously rearranged to yield 1,4-dicyanobut-1-ene which undergoes a secondary reaction as described above.

In the reaction of 1-cyanobuta-1,3-diene with hydrocyanic acid, all these undesirable reactions are limited to a minimum or are completely suppressed if the basic catalyst is added to the reaction mixture consisting of 1-cyanobuta-1,3-diene, hydrocyanic acid and, if desired, an inert polar solvent, only in such an amount that a sample of the mixture diluted with 15 times its volume of aqueous methanol of 35% strength has a pH value within the range of about 5.8 to about 7.5, and preferably 6.2 to 6.8. A minimum quantity of catalyst substance is sufficient for obtaining these pH-values. In some of the tests, however, even these minimum amounts had to be varied in order to obtain identical pH values in a given case. With the same pH-value, test results were obtained which were reproducible within relatively narrow limits. From this it follows that it is not the quantity of the alkaline components added but the pH-value to which the mixture is adjusted which is characteristic of the reaction and accounts for the success of the process. In other words, we have found that for some reasons which are not yet quite clear, starting mixtures of the same percentage composition may have very different pH-values and that it is essential to maintain a definite pH value which is readjusted by the addition of small but in many cases differing amounts of catalyst. We have found that a continuous control of the pH is not possible in the non-aqueous reaction solutions themselves and that the pH measurements only yield useful, reproducible and constant results when samples of the solutions are mixed with corresponding aqueous methanol solutions in which the pH is then measured. In the process according to the present invention, the quantities of the basic catalyst which are added, therefore, amount to only a fraction of the above-mentioned quantities of catalyst hitherto used.

This characterization of the necessary quantities of basic substances is more suitable for the present reaction than the indications of the amounts by weight, for example in percent, since the quantity expressed by the pH value measured in a constant aqueous dilution is essential for the course of the reaction and since in this manner the different basicities of different catalysts are taken into consideration. The pH value at which optimum results are obtained and, therefore, the amount of catalyst to be added, depend not only on the basicity of the catalyst but also on the content of hydrocyanic acid and cyanobutadiene in the reaction mixture, the kind of solvent used and the nature of the by-products which may form in relatively small quantities. In each case, the quantity of catalyst added is so small that it is substantially impossible exactly to indicate the amount in percent by weight.

The great extent to which the dicyanobutene formation depends on the quantity of catalyst added is illustrated by the fact that a reaction carried out under otherwise the same reaction conditions but at a pH value which is only 0.1 to 0.2 units above or below the pH value at which optimum results are obtained leads to considerably poorer yields of dicyanobutene.

According to the known method, the addition of hydrocyanic acid to 1-cyanobutadiene is carried out in the presence of considerably greater amounts of alkali metals as catalyst because these known reaction solutions, after dilution with 15 times their volume of methanol of 35% strength, have a pH value above 8.0. All attempts to achieve a suitable synthesis of 1,4-dicyanobutenes have, therefore, failed. When the alkalinities in the known processes for the addition of hydrocyanic acid to acrylonitrile are determined in the same manner, the values found are also exclusively above a pH of 8.0, in general above 9.5.

The process according to the present invention essentially comprises reacting 1-cyanobuta-1,3-diene with hydrocyanic acid at a temperature within the range of about +10° C. to about +75° C., preferably +55° C. to +65° C., in the presence of agents giving an alkaline reaction. These agents are used in such an amount that the reaction mixture, after dilution with aqueous methanol, has a pH of 5.8 to 7.5. The concentration of the reaction products formed, i.e. the 1,4-dicyanobutenes, in the reaction mixture is, in general, not allowed to exceed about 12%.

The reaction is advantageously carried out in the presence of polar solvents. Suitable solvents which under the reaction conditions used neither react with cyanobutadiene nor with hydrocyanic acid or hydrocyanic acid adducts and which can be easily separated from the reaction products by distillation, are, for example, acetonitrile, propionitrile, dimethyl formamide and mixtures thereof. By the addition of such inert diluents to the mixture of cyanobutadiene and hydrocyanic acid, any possible side reactions, particularly resin formation, are largely suppressed. Experiments have shown that the pH value which is most favorable for the reaction depends to a certain extent on the solvent. When, for example, acetonitrile is used, the pH is advantageously adjusted to about 6.5 to about 6.7, and when dimethylformamide is used as solvent and diluent, the pH is advantageously adjusted to about 6.3 to about 6.5, these pH values being determined as described above in samples taken from the reaction mixture. When mixtures of the aforesaid solvents are used, the pH is advantageously adjusted to about 6.2 to about 7.2.

We have also found that the yields of 1,4-dicyanobutene depend on the conversion of 1-cyanobutadiene and hydrocyanic acid, especially when both reaction components are present in such amounts that the concentration of 1,4-dicyanobutenes in the reaction solution can increase to more than about 12%. Optimum yields of 1,4-dicyanobutene, calculated on the amounts of 1-cyanobutadiene and hydrocyanic acid consumed, are, in general, obtained when the quantities of cyanobutadiene and hydrocyanic acid which have undergone conversion are allowed to increase only to such an extent that the reaction mixture contains less than about 10% of dicyanobutene. Higher concentrations of dicyanobutene considerably reduce the yield of 1,4-dicyanobutene and favor the formation of by-products.

The formation of resinous by-products can be additionally reduced by other measures, for example by conducting the reaction in an inert atmosphere, that is to say with the exclusion especially of air and oxygen or by adding to the reaction mixture stabilizing compounds, such as hydroquinone or phenothiazine, in a concentration of about 0.01% calculated on the reaction mixture.

For adjusting the pH value, all substances giving an alkaline reaction may be used, for example hydroxides, carbonates, cyanides or cyanates of the alkali metals or alkaline earth metals, ammonia or organic bases, such as amines, quaternary ammonium hydroxides or pyridines.

The process according to the present invention may be carried out in the gaseous or liquid phase in a continuous or discontinuous manner. It is, however, preferred to conduct the reaction in the liquid phase in view of the better space/time yield. In general, the process is carried out in the liquid phase as follows:

A mixture of cyanobutadiene, hydrocyanic acid and a solvent, for example a mixture consisting of 50% by volume of acetonitrile, 30% by volume of 1-cyanobutadiene and 20% by volume of hydrocyanic acid is adjusted to a pH value within the range of 6.5 to 7.2 by the addition of a substance giving an alkaline reaction. The pH value is measured in the aqueous-alcoholic dilution described above. The solution is then heated to the reaction temperature. When about 10 to 20% of the cyanobutadiene used as starting material has undergone conversion, calculated on the amount of cyanobutadiene used, the reaction is interrupted and the solution worked up by distillation. The crude 1,4-dicyanobutene can be separated from the portions of cyanobutadiene and hydrocyanic acid which have not been reacted and from the solvent in a simple manner owing to the great differences in boiling point. The starting materials which have thus been separated are again subjected to the reaction after readjustment of the pH value.

The continuous manufacture of 1,4-dicyanobutenes by the reaction of 1-cyanobutadiene with hydrocyanic acid in the liquid phase may be carried out, for example, in an apparatus substantially comprising a mixing vessel, a heatable reaction vessel, a distilling device and intermediate containers. The mixing vessel serves for the preparation of the mixture of cyanobutadiene, solvent and hydrocyanic acid and for the adjustment of the pH value. The finished starting solution is introduced into the reaction vessel and reacted at elevated temperatures. In the following distillation, the portions of cyanobutadiene and hydrocyanic acid which have not been reacted and the solvent are separated under reduced pressure from the crude 1,4-dicyanobutene containing the total of the by-products formed during the reaction. The starting materials which have been distilled off flow into the mixing vessel. After replacement of the consumed portions of cyanobutadiene and hydrocyanic acid and adjustment of the pH value, the mixture is returned to the reaction vessel.

The crude 1,4-dicyanobutene so obtained is worked up by distillation and yields the desired products in a very pure form.

The yields of 1,4-dicyanobut-1-ene in admixture with 1,4-dicyanobut-2-ene amount, in general, to 80 to 87% calculated on the total of 1-cyanobutadiene consumed during the reaction and to 85 to 90% calculated on the total of hydrocyanic acid consumed.

The following examples are given for the purpose of illustrating the present invention:

Example 1

237 grams (3 mols) 1-cyanobuta-1,3-diene stabilized with hydroquinone are diluted with 400 cc. acetonitrile and 6 cc. water and 108 grams (4 mols) hydrocyanic acid are subsequently added. Solid potassium cyanide is introduced into this mixture in such an amount that a sample taken from the starting solution and diluted with aqueous methanol has a pH value of 6.5 to 6.6. The quantity of potassium cyanide necessary to adjust the starting solution to this pH value is extremely small. To determine the pH value, the solution is diluted, per 1 cc. with 15 cc. 35% aqueous methanol. The reaction mixture is then heated to about +60° C. while maintaining the pH constant. Any possible drop in the pH value can be corrected by the further addition of potassium cyanide.

The course of the reaction is controlled by determination of the quantity of hydrocyanic acid and cyanobutadiene contained in the solution. After heating for 2 hours, 11.35% of the hydrocyanic acid used has been reacted. The reaction is then interrupted and the solution worked up by distillation under reduced pressure. After separation of the portions of starting materials which have not been reacted and the solvent which is quantitatively recovered, an oily crude product is obtained which, after neutralisation of the potassium cyanide contained therein, is separated into the following fractions.

Fraction I boiling at 133 to 147° C. under a pressure of 6 mm. of mercury: 40.1 grams;
Fraction II boiling at 150 to 170° C. under a pressure of 6 mm. of mercury: 6.2 grams;
Distillation residue: 4.2 grams.

The elementary analysis, the molecular weight and the infra-red tests show that the first fraction is a pure mixture of isomeric 1,4-dicyanobut-1-ene and isomeric 1,4-dicyanobut-2-ene. Most of the isomeric 1,4-dicyanobut-2-ene crystallizes at room temperature and melts at 75 to 76° C. as is also known from the literature. The second fraction consists predominantly of dimeric 1-cyanobuta-1,3-diene.

Of the 1-cyanobuta-1,3-diene used as starting material a total of 37.3 grams (=15.7%) is consumed. The yield of 1,4-dicyanobutene amounts to 80.1% calculated on the amount of 1-cyanobutadiene which has been reacted and 83.5% calculated on the amount of hydrocyanic acid which has been reacted.

The recovered mixture of starting materials which have not been reacted and solvent can be re-used for the reaction without difficulty.

Example 2

237 grams (3 mols) 1-cyanobuta-1,3-diene stabilized with phenothiazine is mixed with 450 cc. propionitrile as solvent and diluent and with 135 grams (5 mols) hydrocyanic acid. The mixture is adjusted to a pH of 6.7 by the addition of an aqueous potassium hydroxide solution. The pH is determined in the same dilution as that described in Example 1.

The starting solution is heated for 2½ hours at +60° C. 12.36 grams hydrocyanic acid are consumed, which corresponds to a conversion of hydrocyanic acid of 9.1%. The potassium hydroxide contained in the solution is then neutralized and the reaction products are isolated by distillation. The following fractions are obtained.

Fraction I boiling at 116 to 128° C. under a pressure of 2 mm. of mercury=41.3 grams 1,4-dicyanobutene;
Fraction II boiling at 130 to 170° C. under a pressure of 2 mm. of mercury: 5.8 grams;

the latter fraction consists predominantly of dimeric 1-cyanobuta-1,3-diene; distillation residue: 5.1 grams.

A total of 38.7 grams 1-cyanobutadiene is consumed, which corresponds to a conversion of cyanobutadiene of 16.4% calculated on the amount of cyanobutadiene used as starting material. The yield of the mixture of the 1,4-dicyanobutenes amounts to 79.5%, calculated on the amount of cyanobutadiene consumed, and to 85.2% calculated on the total amount of hydrocyanic acid which has been reacted. The solvent, which is quantitatively recovered, is used for a new batch, together with the portions of starting materials which have not been reacted.

*Example 3*

The starting solution is prepared from 632 grams (8 mols) stabilised 1-cyanobutadiene, 600 cc. dimethyl formamide and 216 grams (8 mols) hydrocyanic acid. The solution is then adjusted to a pH value of 6.4 with trisodium orthophosphate dodecahydrate

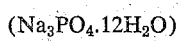

$(Na_3PO_4.12H_2O)$

The pH-value is measured in the same dilution as that described in Example 1.

The mixture is heated for 2 hours at +55 to +60° C. while maintaining the initial pH value. Within this time, 10.5% of the hydrocyanic acid used as starting material undergoes conversion. After neutralisation of the catalyst which has been added, the batch is worked up by distillation. There are obtained 76 grams 1,4-dicyanobutenes boiling at 116 to 128° C. under a pressure of 2 mm. of mercury and 8 grams of another fraction boiling at 130 to 161° C. under a pressure of 2 mm. of mercury and consisting predominantly of dimeric 1-cyanobuta-1,3-diene. The distillation residue amounts to 8.7 grams.

In the reaction a total of 68.4 grams of 1-cyanobuta-1,3-diene is consumed, which corresponds to a conversion of 1-cyanobutadiene of 10.8%, calculated on the amount of 1-cyanobutadiene used as starting material. The yield of 1,4-dicyanobutenes amounts to 82.9%, calculated on the conversion of 1-cyanobutadiene, and to 85.8% calculated on the conversion of hydrocyanic acid.

The dimethyl formamide used as solvent and diluent is quantitatively recovered and can be used for another batch, together with the portions of the starting materials, i.e. 1-cyanobutadiene and hydrocyanic acid, which have not been reacted.

*Example 4*

This example describes a continuous mode of operation. 25 liters of a mixture consisting of 48.8% by volume dimethyl formamide, 31% by volume (83 mols) 1-cyanobuta-1,3-diene, 19.2% by volume (124 mols) hydrocyanic acid and 1% by volume water, is mixed in a mixing vessel with such an amount of potassium cyanide that its pH value amounts to 6.4 to 6.5, determined in an aqueous alcoholic solution, i.e. at a dilution of 1 cc. of a sample of the mixture with 15 cc. 35% methanol.

The starting solution is continuously conducted through a reaction system which is heated at a temperature of +60 to +65° C. and is then introduced into a distillation apparatus where the portions of 1-cyanobutadiene and hydrocyanic acid which have not been reacted and the dimethyl formamide are separated under reduced pressure from the 1,4-dicyanobutene which has a considerably higher boiling point and from the by-products formed which are drawn off together with the 1,4-dicyanobutene. The starting materials which have been distilled off are returned to the mixing vessel. After replacement of the portions of 1-cyanobutadiene and hydrocyanic acid which have been consumed by the reaction and after readjustment to a pH of 6.4 to 6.5, the mixture is returned to the reaction system.

The period of time for which the mixture stays in the heated reaction system is chosen in such a manner that about 10% of the hydrocyanic acid used as starting material undergoes conversion, which takes about 2½ hours.

The separated crude 1,4-dicyanobutene is rendered weakly acid with concentrated phosphoric acid and distilled off under reduced pressure. 1156 grams of the isomeric 1,4-dicyanobutenes are obtained.

When the 25 liters of mixture have passed once through the reaction system, 342 grams hydrocyanic acid and 1030 grams 1-cyanobutadiene have been consumed. The yield of 1,4-dicyanobutene amounts to 83.6%, calculated on the total amount of 1-cyanobutadiene which has been reacted and to 86.2% calculated on the total amount of hydrocyanic acid which has been consumed.

*Example 5*

186 cc. 1-cyanobuta-1,3-diene, 38 cc. hydrocyanic acid, 450 cc. acetonitrile and 10 cc. water are mixed and potassium cyanide is added in such an amount that a sample taken from the reaction mixture and diluted with 15 times its volume of 35% aqueous methanol has a pH value of 6.5. After heating for about 2¼ hours at +55° C., 35.6% of the hydrocyanic acid used as starting material has undergone conversion. The solution is worked up in the manner described in Example 1.

32.8 grams 1,4-dicyanobutene are obtained, which corresponds to a yield of 87% calculated on the amount of hydrocyanic acid consumed. A total of 2.5 grams of by-products is obtained.

After replacement of the consumed portions of cyanobutadiene and hydrocyanic acid and addition of the corresponding amount of potassium cyanide, the recovered starting materials are again reacted.

*Example 6*

49.5 kg. of a reaction solution consisting of 51.25% acetonitrile, 20% dimethyl formamide, 25.1% 1-cyanbuta-1,3-diene and 3.65% hydrocyanic acid are treated with solid sodium cyanide until a sample of the reaction solution, after diluting with 15 times its volume of 35% methanol, possesses a pH value of 7.0. This reaction mixture is subsequently heated for a period of 40 minutes to 58–60° C. whereby 36.7% of the amount of hydrocyanic acid introduced reacts. After neutralisation of the added catalyst with anhydrous hydrogen chloride, the reaction mixture is worked up by distillation under reduced pressure, the unreacted starting materials and the mixture of solvents being recovered quantitatively. In the case of this reaction mixture, a total of 2.47 kg. of pure 1,4-dicyanbutene are obtained. This corresponds to yield of 94.9%, calculated on the amount of hydrocyanic acid reacted, and to 92.6%, calculated on the amount of cyanbutadiene used.

By the use of this method with mixtures of solvents, an increase in yield is obtained in comparison with the yields obtained in the previous examples. Whereas in the previous examples yields of about 80–87% were obtained, the yields now amount to about 90–95%. These yields of dicyanbutene are higher with regard to the amount of cyanbutadiene used and also with regard to the amounts of hydrocyanic acid used. It can also be seen from the above-mentioned working method with mixtures of solvents that combinations of about 50–75% by weight of solvent, about 1–20% by weight of hydrocyanic acid and residues of 1-cyanbuta-1,3-diene can be employed as reaction mixtures. However, this variation is also possible in the case of using pure solvents instead of mixtures of solvents. Finally, as can be seen from Example 6 the possibility exists of using shorter reaction times. We have found that the reaction time is dependent upon the composition of the reaction solution.

We claim:
1. A process for the manufacture of 1, 4-dicyanobutene-1 and 1,4-dicyanobutene-2 which comprises reacting 1-cyanobutadiene-1,3 with hydrocyanic acid at a temperature within the range of about 10 to about 75° C. in the presence of an inert, polar solvent selected from the group consisting of acetonitrile, propionitrile and dimethylformamide, a stabilizer for inhibiting the polymerization of the reactants, and a substance selected from the group consisting of alkali metal hydroxides, alkali metal carbonates, alkali metal cyanides, alkali metal cyanates, alkaline earth metal carbonates, alkaline earth metal cyanides, alkaline earth metal cyanates, and ammonia, which substance adjusts the pH of the reaction mixture to a value in the range from 5.8 to 7.5, determined by measuring a sample consisting of one part by volume of the reaction mixture and 15 parts by volume of aqueous methanol of 35% strength, interrupting the reaction when the concentration of the 1,4-dicyanobutene in the reaction mixture amounts to at most 12% by weight, and distilling the reaction mixture to yield the pure final product.

2. The process of claim 1, wherein the reaction is carried out at a temperature within the range of +55° C. to +65° C.

3. The process of claim 1, wherein the concentration of the 1,4-dicyanobutenes in the reaction mixture amounts to only about 10%.

4. The process of claim 1, wherein the pH value is adjusted to about 6.5 to about 6.7 when acetonitrile is used as solvent and diluent.

5. The process of claim 1, wherein the pH value is adjusted to about 6.3 to about 6.5 when dimethylformamide is used as solvent and diluent.

6. The process of claim 1, wherein the process is carried out discontinuously and the recovered products which have not been reacted are again subjected to the reaction.

7. The process of claim 1, wherein the process is carried out continuously and the starting products which have not been reacted are recycled to the reaction after being separated.

8. The process of claim 1 wherein alkaline catalysts are added to the reaction mixture giving a pH-value from about 6.2 to about 6.8.

9. The process of claim 1 wherein about 0.01% by weight of said stabilizer selected from the group consisting of hydroquinone and phenothiazine is added to the reaction mixture, the percentage being calculated on the reaction mixture.

No references cited.